(12) United States Patent
Ausserlechner

(10) Patent No.: US 9,470,552 B2
(45) Date of Patent: Oct. 18, 2016

(54) AXIAL AND PERPENDICULAR ANGLE SENSOR IN SINGLE PACKAGE

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 239 days.

(21) Appl. No.: 14/174,580

(22) Filed: Feb. 6, 2014

(65) Prior Publication Data

US 2015/0219472 A1 Aug. 6, 2015

(51) Int. Cl.
| | |
|---|---|
| *G01R 33/02* | (2006.01) |
| *G01R 33/06* | (2006.01) |
| *G01D 5/12* | (2006.01) |
| *G01D 5/14* | (2006.01) |
| *G01B 7/30* | (2006.01) |

(52) U.S. Cl.
CPC ............ *G01D 5/12* (2013.01); *G01B 7/30* (2013.01); *G01D 5/145* (2013.01)

(58) Field of Classification Search
CPC ...... G01R 33/07; G01R 33/09; G01D 5/145; G01B 7/30
USPC ............ 324/207.23, 207.2, 207.21, 252, 251
See application file for complete search history.

(56) References Cited

U.S. PATENT DOCUMENTS

| | | | | |
|---|---|---|---|---|
| 6,304,074 | B1* | 10/2001 | Waffenschmidt | ........ G01B 7/30 324/202 |
| 8,058,866 | B2* | 11/2011 | Granig | ................... G01D 5/145 324/207.21 |
| 2014/0021941 | A1 | 1/2014 | Van Veldhoven et al. | |

OTHER PUBLICATIONS

Non Final Office Action Dated Aug. 11, 2016 U.S. Appl. No. 15/211,267.

* cited by examiner

*Primary Examiner* — Reena Aurora
(74) *Attorney, Agent, or Firm* — Eschweiler & Associates, LLC

(57) ABSTRACT

Embodiments relate to magnetic field angle sensors that utilize axial and perpendicular sensors collectively to infer a rotational angle. In embodiments, a sensor system comprises at least one axial sensor unit and at least one perpendicular sensor unit arranged in a single sensor package or on a single substrate. The axial and perpendicular sensor data both representative of the rotational position can be used to improve output angle accuracy by, e.g., calibrating the sensor system.

15 Claims, 5 Drawing Sheets

AXIAL AND PERPENDICULAR ANGLE SENSOR IN SINGLE PACKAGE

TECHNICAL FIELD

The invention relates generally to magnetic field sensors, and more particularly to magnetic field sensors comprising both axial and perpendicular angle sensors in a single package.

BACKGROUND

Magnetic field sensors can be used to sense an angle of rotation of a shaft. For example, a magnet can be mounted on the shaft such that it rotates with the shaft, and a magnetic field sensor can be arranged proximate the magnet in order to sense a magnetic field induced by the magnet as it rotates with the shaft. When the magnetic field sensor is mounted next to or adjacent the shaft, i.e., off of the axis of rotation of the shaft, the sensor is often referred to as an "off-axis" magnetic field angle sensor. Off-axis magnetic field angle sensors often are implemented when the end of the shaft is unavailable as a location for the sensor or there simply is not space available on the shaft. An "on-axis" magnetic field sensor is one in which the sensor is mounted at or near the end of the shaft, generally in-line with or on the axis of rotation. Examples of off-axis and on-axis sensors are perpendicular angle sensors and axial angle sensors.

Axial angle sensors are magnetic field angle sensors that utilize the axial magnetic field component to infer the rotation angle. The sensors perform optimally with fields that are linearly varying in two components and must be arranged in an off-axis configuration because the axial magnetic field component cannot be detected on the axis of rotation for many types of common magnets such as diametrically magnetized magnets of rotational shape. An additional feature of axial angle sensors is that the sensors are robust against external magnetic disturbances. Perpendicular angle sensors, on the other hand, perform optimally with homogeneous magnetic fields and utilize radial and azimuthal magnetic field components to infer a rotation angle. The perpendicular angle sensors can be manufactured for robustness against assembly tolerances and can be arranged in an on-axis configuration. In many applications there is a general preference for magnetic field angle sensors, whether off- or on-axis or axial or perpendicular, to be inexpensive while also being robust with respect to external magnetic fields and other disturbances. A drawback of some perpendicular angle sensors, then, is that they are not robust against external magnetic fields and other disturbances. While axial sensors are more robust with respect to these disturbances, axial sensors are more sensitive to assembly tolerance errors. Other drawbacks to conventional approaches include the inability to provide a robust sensor that is capable of detecting angles over a full 360 degree range. In general, therefore, there are numerous drawbacks associated with conventional magnetic field angle sensors.

SUMMARY

Embodiments relate to magnetic field sensors, such as magnetic field sensors comprising both axial and perpendicular angle sensors in a single package.

In an embodiment, a magnetic field sensor system comprises a support structure; a first sensor arranged on the support structure relative to an axis of rotation of a magnetic field source and comprising a first plurality of sensor elements configured to sense magnetic field components along a first direction and to derive a first rotation angle unambiguously in a range of at least 90 degrees; and a second sensor arranged on the support structure relative to the axis of rotation and comprising a second plurality of sensor elements configured to sense magnetic field components along a second direction different from the first direction and to derive a second rotation angle unambiguously in a range of at least 70 degrees, wherein only one of the first direction or the second direction is perpendicular to the axis of rotation.

In an embodiment, a method comprises providing a sensor system comprising a first sensor and a second sensor coupled to a support structure; sensing magnetic field components along a first direction by the first sensor to derive a first rotation angle unambiguously in a range of at least 90 degrees; sensing magnetic field components along a second direction different from the first direction by the second sensor to derive a second rotation angle unambiguously in a range of at least 70 degrees; and calibrating the sensor system using at least one of the first rotation angle or the second rotation angle.

BRIEF DESCRIPTION OF THE DRAWINGS

The invention may be more completely understood in consideration of the following detailed description of various embodiments of the invention in connection with the accompanying drawings, in which.

Figure 1:
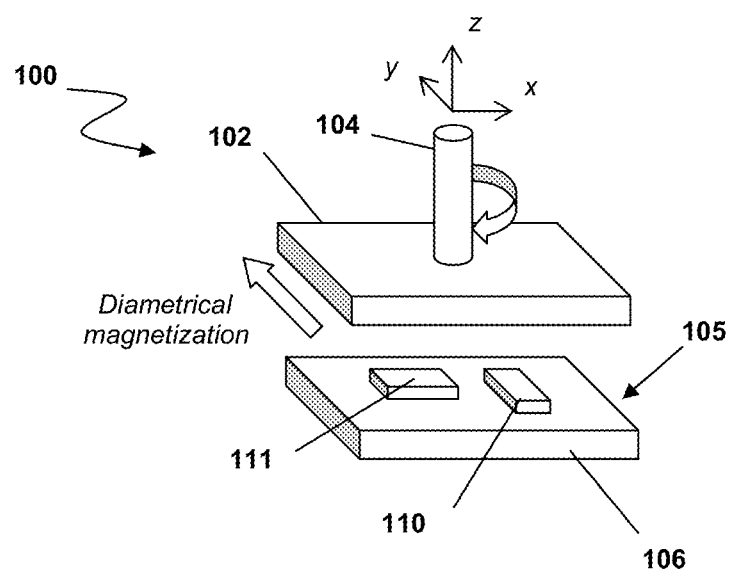
FIG. 1 depicts a perspective diagram of a magnetic field angle sensor according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to magnetic field angle sensor systems that utilize axial and perpendicular sensors collectively to infer a rotational angle. In embodiments, a sensor system comprises at least one axial sensor and at least one perpendicular sensor arranged in a single sensor package or on a single substrate. The axial and perpendicular sensor data both representative of the rotational position can be used to improve output angle accuracy by, e.g., calibrating the sensor system. For example, in one embodiment the perpendicular sensor can provide a first estimate or approximation of the rotational position, the axial sensor can provide a second estimate or approximation of the rotational position, and the sensor system or circuitry coupled thereto can combine the first and second estimates.

The terms "perpendicular angle sensors" and "axial angle sensors" are referred to in the article Ausserlechner, "A Theory of Magnetic Angle Sensors with Hall Plates and Without Fluxguides," Progress in Electromagnetics Research B, Vol. 49, 77-106, 2013, which is incorporated herein by reference in its entirety.

Referring to FIG. 1, an example of a sensor system 100 is depicted. Sensor system 100 comprises a magnet 102 mounted or otherwise affixed to a shaft 104 such that magnet 102 rotates with shaft 104. A sensor package 105 comprises a substrate 106 and is arranged proximate magnet 102 and shaft 104. In various embodiments, substrate 106 can comprise a substrate, a semiconductor die, a leadframe coupled with one or more semiconductor dies, a component board, a combination thereof or some other support structure capable of establishing and/or maintaining an accurate or relative placement of sensors 110 and 111 with respect to each other and/or at least one other component. For example and simplicity, the term "substrate" will generally be used herein throughout but is not limiting with respect to all embodiments and/or the scope of the claims. In sensor system 100, sensor package 105 is arranged coaxially with shaft 104, with substrate 106 oriented perpendicularly thereto. A major plane of substrate 106, i.e., the xy-planar surface facing upwardly in the orientation of FIG. 1, is arranged perpendicularly to the rotation axis of shaft 104 as illustrated. In other embodiments, substrate 106 can be arranged with the xy-planar surface facing downwardly away from magnet 102.

In embodiments, sensor package 105 comprises at least two axial sensors 110 and at least two perpendicular sensors 111 arranged on substrate 106. When referring to sensor 110, "axial" generally refers to a sensor that comprises two or more magnetic sensor elements that are responsive to axial magnetic field components and derives the rotational position of magnet 102 by combining the output signals of the two or more magnetic sensor elements. In addition, when referring to sensor 111, "perpendicular" generally refers to a sensor that comprises two or more magnetic sensor elements that are responsive to magnetic field components perpendicular to the axis of rotation. While one or the other sensor 110 or 111 may be identified as axial or perpendicular in examples given herein, these designations can be reversed with one another or have some other configuration in other embodiments. Additionally, the depiction of sensor system 100 in FIG. 1 is merely a simplified diagram of basic components, which are not to scale and the placement and relative arrangement of which can and will vary in other embodiments. The relative position of substrate 106 and magnet 102 can vary in embodiments, as can the relative arrangement and orientations of axial sensor 110 and perpendicular sensor 111, with FIG. 1 being exemplary of but one embodiment. For example, in other embodiments, sensors 110 and 111 of sensor package 105 may be arranged separately on two substrates, proximate (e.g., concentric, adjacent or in some other arrangement) one another on a single die, in a die-on-die configuration, or arranged adjacently on both sides of a lead frame. Moreover, FIG. 1 is not to scale and is a simplified conceptual depiction to illustrate basic components and features of an embodiment of sensor system 100. Other example embodiments will be discussed elsewhere herein.

Magnet 102 has a diametric magnetization in the direction indicated in FIG. 1, i.e., the y-direction, and induces a magnetic field that is perpendicular to the rotation axis of shaft 104 and magnet 102. In other embodiments, magnet 102 can have an additional or sole axial magnetization or comprise some other type of magnet. Axial sensor 110 is sensitive to magnetic field components which are perpendicular to the xy-planar surface of substrate 106 (i.e., axial with respect to the rotation axis). Perpendicular sensor 111 is sensitive to magnetic field components which are parallel to the xy-planar surface of substrate 106 (i.e., perpendicular with respect to the rotation axis).

In embodiments, axial sensor 110 and perpendicular sensor 111 each can comprise at least two sensor elements configured to sense the corresponding magnetic field components to which each sensor is configured to detect. For example, axial sensor 110 can comprise at least two sensor elements, such as a Hall-effect sensor element (e.g., Hall plate), MAGFET and/or other type(s) of magnetic field sensor elements or combinations thereof configured and/or arranged to detect at least one magnetic field component. Similarly, perpendicular sensor 111 can comprise at least two magnetic field sensor element, such as a magneto-resistive (MR) sensor element (e.g., AMR, GMR, TMR and others), giant magneto-impedance (GMI) sensor element, Hall-effect sensor elements (e.g., vertical Hall and others) and other magnetic field sensor elements and combinations thereof. As previously discussed, although the relative arrangement of sensors 110 and 111 can vary in embodiments, it can be advantageous in embodiment to establish accurate placement of sensor 110 with respect to sensor 111 such that sensor package 105 and/or substrate 106, and sensors 110, 111, have corresponding mounting tolerances. Thus, various techniques can be used such as manufacturing both sensors 110 and 111 in the same manufacturing sequence, e.g., a microelectronic fabrication front-end line which defines the relative position of all elements by lithographic steps or other similar techniques to establish accuracies up to sub-micrometers (e.g., better than about 20 μm).

Figure 2:
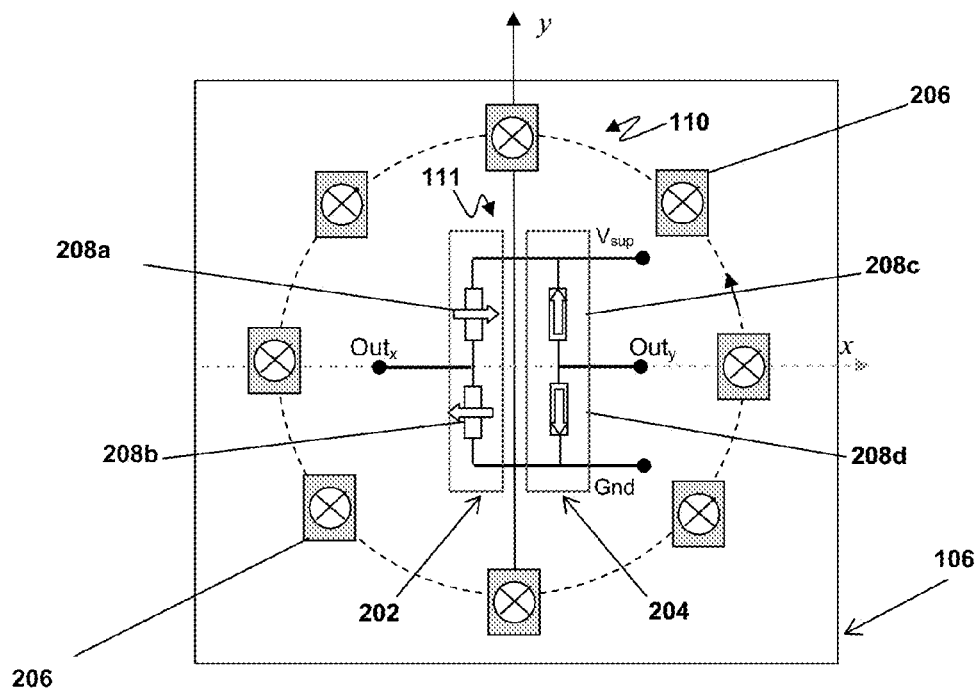
FIG. 2 depicts a block diagram of a sensor package according to an embodiment.

Referring to FIG. 2, a sensor substrate 106 is shown according to an embodiment. Substrate 106 can be arranged on or in a sensor package (e.g., 105 in FIG. 1) in embodiments. In embodiments, axial sensor 110 can comprise a plurality of sensor elements 206. The plurality of sensor elements 206 can comprise horizontal Hall (HHall), MAG-FET or other suitable magnetic field sensor elements. In the embodiment of FIG. 2, axial sensor 110 comprises eight sensor elements 206 arranged symmetrically and equidistantly angularly spaced along a circular curve on substrate 106. The circular curve can be centered on, e.g., a projection of the axis of rotation of shaft 104 and/or magnet 102 onto substrate 106 in an embodiment. In FIG. 2, adjacent ones of the plurality of sensor elements 206 are spaced apart from one another by about 45 degrees along the circular curve. In embodiments, sensor elements 206 are sensitive to an axial magnetic field component Bz, whereby the Bz field component is perpendicular to the xy-planar surface of substrate 106. Axial sensor 110 can be configured in embodiments to output an angular range of 360 degrees to provide continuous and unambiguous detection of the axial magnetic field components, as compared with some conventional sensor systems having only 180 degrees of unambiguous output range.

In embodiments, perpendicular sensor 111 can comprise at least two sensor elements 208, such as four sensor elements 208a-d in the embodiment of FIG. 2, arranged proximate a center of a projection of the rotation axis of shaft 104 and/or magnet 102 on substrate 106. Sensor elements 208 can comprise magneto-resistive or Hall sensor elements such as TMR, GMR, or still other suitable sensor elements in various embodiments. In embodiments, sensor elements 208a-d of perpendicular sensor 111 can be coupled to form first and second evaluation circuits 202, 204. In example embodiments, first and second evaluation circuits 202, 204 can be configured to form two half-bridge circuits as illustrated in FIG. 2 or any other circuits specific to an application or sensor requirement. Each evaluation circuit 202, 204 can be configured to measure perpendicular magnetic field components (e.g., Bx, By) and calculate (or provide for calculation by an external circuit or device) a corresponding cosine and sine function of the magnetic field component angle. Alternatively, evaluation circuit 202, 204 can be configured to measure cosine, sine, or square of cosine or sine in the case of AMRs, of an angle between a projection of the magnetic field onto the xy-plane and a reference direction. In such a configuration, for example, the reference direction can be denoted by an arrow symbol as depicted in FIG. 2, and evaluation circuit 202 can provide an output signal that is proportional to the cosine of the angle between the projection of the magnetic field onto the xy-plane and a positive x-direction. In other embodiments, sensor elements 208 can be sensitive to other field components depending upon the particular arrangement of substrate 106, sensor elements 208, shaft 104 and/or magnet 102. First evaluation circuit 202 can comprise sensor elements 208a, 208b arranged symmetrically in a 180-degree orientation from one another (i.e., generally in-line with one another in at least one embodiment), whereby sensor element 208a is electrically coupled to sensor element 208b to form evaluation circuit 202. Each sensor element 208a, 208b is configured to respond to the angle between the reference direction (i.e., positive or negative x-direction) and the in-plane projection (i.e., xy-projection) of the applied magnetic field. Second evaluation circuit 204 can comprise sensor elements 208c, 208d arranged symmetrically in 180 degree orientation from one another to form an electrical series connection. Each sensor element 208c, 208d of evaluation circuit 204 can be configured to respond to the angle between the reference direction (i.e., positive or negative y-direction) and the in-plane projection (i.e., xy-projection) of the applied magnetic field. The arrangement of sensor elements 208a-d as described herein is merely exemplary and can vary in other embodiments in which, for example, more or fewer sensor elements can be provided.

In embodiments, evaluation circuits 202, 204 can be configured to generate an output signal Outx and/or Outy related to an angular position of magnet 102, wherein those signals are induced by the presence of a magnetic field associated with the radial and azimuthal field components. For example, the presence of a magnetic field can cause a resistance change in sensor elements 208a-d, such that the resistance of sensor elements 208a and 208b increases as the resistance of sensor elements 208c and 208d decreases. As such, the change in resistance can be characterized by signals provided at Outx and Outy. The size and magnitude of each sensor element 208a-d can vary in embodiments where, for example, individual resistor sizes can range from several about hundred Ohms to relatively large sizes of about 50 k Ohms or greater. Similarly, as previously discussed, perpendicular sensor 111 can comprise various magneto-resistive sensor elements 208a-d, whereby the use of sensor elements such as TMR, for example, can generate larger output signals Outx, Outy that allow for raw (i.e., non-scaled) data to be processed by an external processing unit (e.g., computer, controller, processor or other circuitry in embodiments). In addition, the use of TMR sensor elements in embodiments can be advantageous in that: i) no additional chip space is required because the sensor elements can be sputtered above substrate 106 which comprises both axial sensor 110 and signal conditioning circuitry, ii) the use of bias circuitry can be avoided because the sensor elements can be arranged in a full or half bridge circuit that is supplied by a voltage source, iii) signal conditioning is not required because the output voltages are strong (e.g., >100 mV) such that the voltages can be measured directly by any voltmeter connected to the sensor, iv) offset errors are negligible because of the high magnetic sensitivity and other errors (e.g., synchronicity between orthogonal bridges and orthogonality errors or temperature dependence of various parameters which are cancelled out in the output signal in first order) are also negligible, and v) current consumption can be reduced below 100 µA at 2V supply.

In embodiments, and in operation, evaluation circuits 202, 204 can be configured to selectively power on and off perpendicular sensor 111 to reduce the amount of power consumed by sensor system 100. For example, during installation or calibration, system 100 can use sensor 111 to identify the magnitude of assembly tolerances, whereas during normal operation axial sensor 110 can be used alone, in one embodiment. In embodiments, evaluation circuits 202, 204 can be electrically coupled to a supply source via a positive potential (Vsup) and reference potential (Gnd) that provide power to perpendicular sensor 111, whereby the reference potential (Gnd) can be collectively used by both axial sensor 110 and perpendicular sensor 111 such that sensor 111 has a dedicated positive potential (Vsup). In such a configuration, perpendicular sensor 111 can be selectively powered off either by disconnecting the positive potential (Vsup) or by connecting the positive potential (Vsup) to the reference potential (Gnd) while axial sensor 110 remains powered. In other embodiments, for example, sensor elements 208a-d can be configured with relatively high resistances (e.g., greater than 50 k Ohms in embodiments) to reduce the need for additional circuitry to remove power from perpendicular sensor 111, whereby the high resistances can result in a simultaneous decrease in the amount of current consumed by sensor system 100. Although perpendicular sensor 111 can experience increased noise as a result of the use of relatively high resistances, this can be addressed by having longer measurement times (i.e., longer integration times) and/or a larger number of sampled data because the rotational speed can be reduced during calibration. These example embodiments are for illustration purposes only and are in no way limiting to other or all embodiments.

Figure 3:
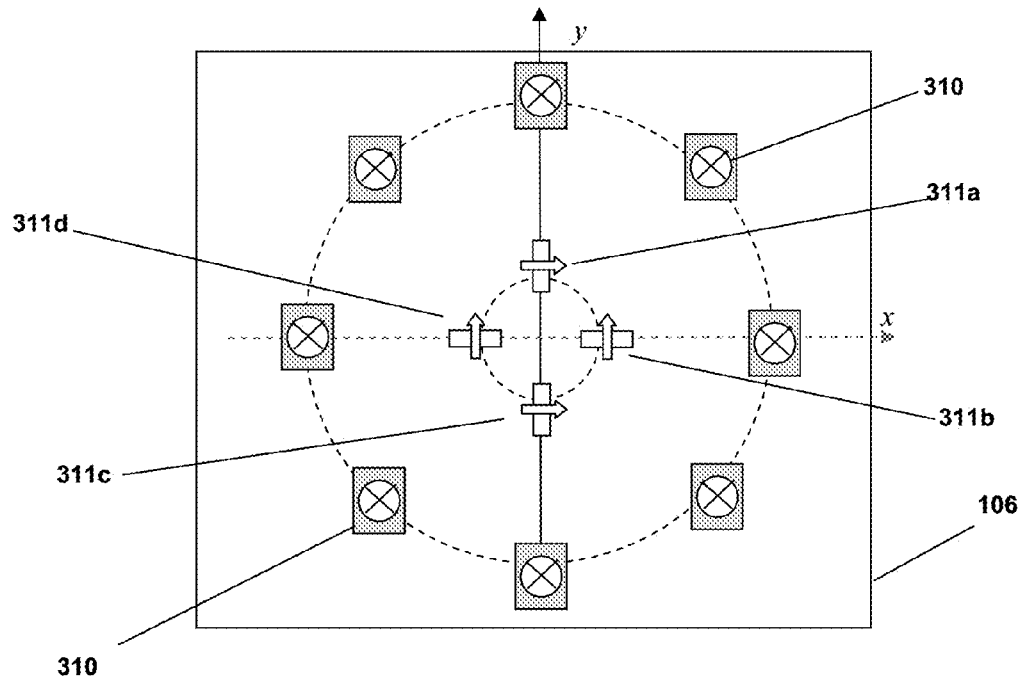
FIG. 3 depicts a top view of a sensor package arranged on a substrate according to an embodiment.
Figure 4:
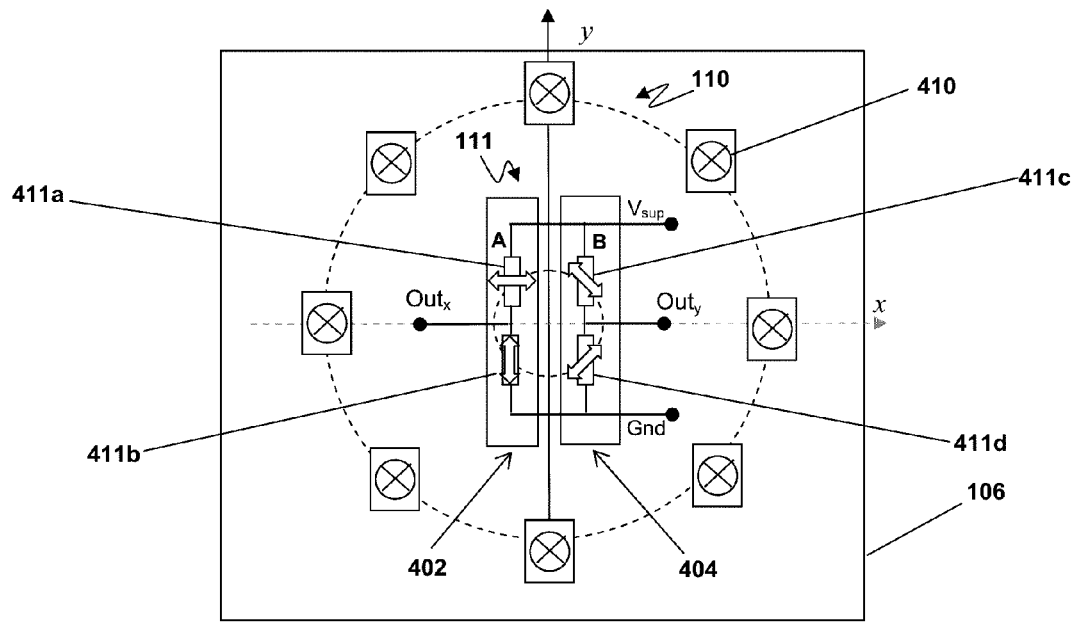
FIG. 4 depicts a top view of a sensor package arranged on a substrate according to an embodiment.

Referring to FIGS. 3 and 4, another embodiment is depicted. In FIGS. 3 and 4, axial sensor 110 comprises a plurality of sensor elements 310, 410 and perpendicular sensor 111 comprises a plurality of, such as at least three, sensor elements 311, 411 arranged on substrate 106. Similar to sensor elements 206 of the embodiment of FIG. 2, sensor elements 310 and 410 can be arranged symmetrically and equidistantly angularly spaced along a closed curve that can be circular as depicted in FIGS. 3 and 4, or another closed curve such as a square or some other shape in embodiments, an open curve, or some other suitable arrangement, and can comprise horizontal Hall (HHall), MAGFET or other suitable magnetic field sensor elements. In embodiments, sensor elements 311a-d can comprise vertical Hall sensor elements in which the sensor elements are responsive to magnetic field components Bx and By that are parallel to the xy-planar surface of substrate 106 (i.e., perpendicular with respect to the rotation axis). As depicted in FIG. 3, sensor elements 311a-d can be arranged proximate a center of a projection of the rotation axis of shaft 104 and/or magnet 102 on substrate 106 and can be oriented in 90-degree rotation from adjacent ones of sensor elements 311 and can be equidistantly angularly spaced from one another. Sensor elements 311a-d can have relatively small dimensions in embodiments and be centrally arranged with respect to the projection of the rotation axis to increase the precision of the measured magnetic field angles.

An additional technique to increase the accuracy of the measured angles can be to reduce an offset voltage (i.e., an output voltage at the sense contacts of a sensor device in the absence of a magnetic field) at sensor elements 311a-d. To reduce the offset voltage, sensor elements 311a-d can be configured as dynamic offset compensation circuits (e.g., spinning current, spinning voltage or other suitable operational schemes), whereby the circuit can be configured to continuously correct or compensate the measured output voltage. For example, the spinning current technique can utilize a Hall device with a number of symmetrically arranged contacts (e.g., four or eight contacts) to induce a spinning current (i.e., current induced by electrical commutation which is applied to different contacts in different phases, where different contacts also can be used as reference and signal contacts in those phases). In such a configuration, offset errors (e.g., voltage errors) can be reduced by averaging a measured output signal of sensor elements 311a-d, whereby the output signals can be relatively small and be processed on- or off-chip (i.e., analyzing the output signal by an external processing unit or circuit) to provide an estimated angle measurement. In other embodiments, each sensor element 311a-d comprising vertical Hall effect devices or other magnetic sensor elements can be configured to share circuit components such as amplifiers, digital to analog converters, biasing circuits, etc., which can also result in a reduction of assembly costs. Such a scheme can be used in other embodiments and/or applied to other sensor elements in various embodiments.

In still other embodiments as depicted in FIG. 4, sensor elements 411a-d can comprise AMR sensor elements, whereby a reference direction associated with the magnetic field component is determined by the direction of current flow irrespective of its polarity. Sensor elements 411a-d can be coupled to form first and second evaluation circuits 402 and 404 similar to the embodiment discussed with reference to FIG. 2, such that evaluation circuits 402, 404 can be configured to form two half-bridges A and B (i.e., A1, A2 ... An or B1, B2 ... Bn) as shown in FIG. 4 according to a single reference direction. In embodiments, the sensor element subparts can be arranged in an alternating arrangement (i.e., A1, B1, A2, B2 ... AnBn) along a circular curve or in a common centroid arrangement (i.e., A1, B1 ... B(n−1), A(n−1), An, Bn). The alternating or centroid arrangement of sensor elements 411 on substrate 106 can lead to a reduction in angle errors because of the finite size and dimensions of sensor elements 411. The angle readings generated by perpendicular sensor 111 can be limited to a continuous 180 degree angular range in embodiments. The limited 180-degree angular range of perpendicular sensor 111 can be used to calibrate axial sensor 110 within a range of 360 degrees. For example, the angular range 0° to 180° can be measured by both sensors, yet perpendicular sensor 111 comprising AMR sensor elements can map the range 180° to 360° onto 0° to 180° while axial sensor 110 measures an angular range of 0° to 360° uniquely.

As a result of assembly tolerances, both sensors 110 and 111 may show slightly different values. During calibration, disturbance fields are desired to be avoided, and the angle measurement provided by sensor 111 can be used because it is more accurate in spite of assembly tolerances at least in the angular range 0° to 180°. In the range of 180° to 360°, sensor 111, for example, outputs 3° while the axial sensor 110 outputs 181°. The 3° output by sensor 111 in fact corresponds to 183°, which sensor 111 maps to 3°, whereas axial sensor 110 outputs 181° instead of the accurate 183° due to assembly tolerances. As such, angle errors associated with axial sensor 110 can be identified by use of sensor 111 comprising AMR sensor elements 411 although AMR sensor elements are not unique in the angular range 0 to 360°. Therefore, to improve angle accuracy, system 100 can be configured to correct the measured output of sensor 110 to correspond to the measured value of sensor 111 (e.g., if axial sensor 110 outputs 181° it has to add 2° to obtain the accurate value 183°). During operation in the field (i.e., normal operation), disturbance fields may exist such that system 100 can rely solely on the outputs from axial sensor 110 because it is robust against disturbances. If perpendicular sensor 111, for example, outputs 5° instead of 3° at 183°, system 100 will only use readings from axial sensor 110 and add 2° to the reading if the reading is around 183°. Although perpendicular sensor 111 is not robust against disturbance magnetic fields as axial sensor 110, sensor 111 can still be operated in the field in order to supply a second rotation angle, which can be used to verify (e.g., at least with an accuracy of about +/−5°) if the axial angle sensor is working correctly. Thus, circuitry such as a microprocessor can be configured to measure both angles, whereby the output of axial sensor 110 is used as an estimation and the output of perpendicular sensor 111 is used as a redundant information source to increase the reliability of system 100 (i.e., to increase functional safety features).

Figure 5:
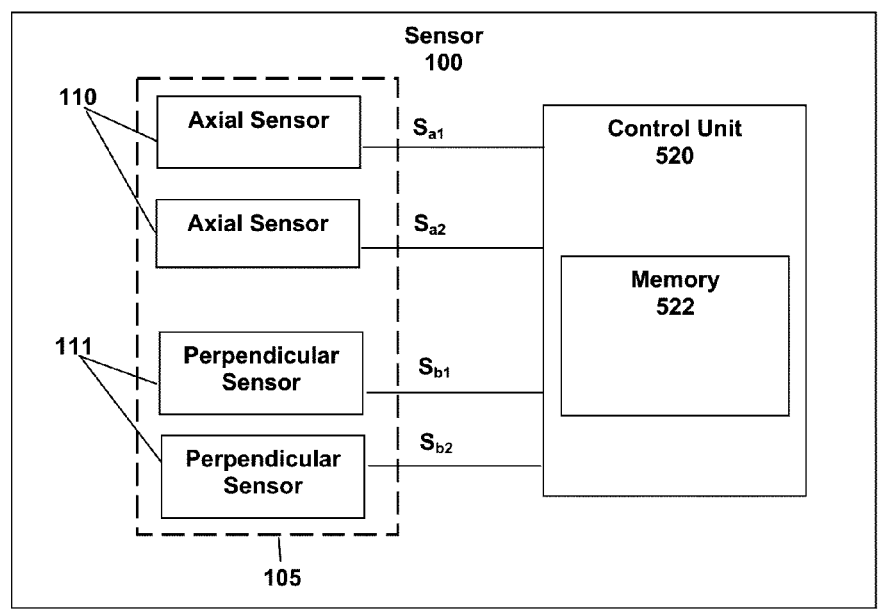
FIG. 5 depicts a top view of a sensor package arranged on a substrate according to an embodiment.

Referring to FIG. 5, and regardless of the particular configuration or embodiment of sensor package 105, substrate 106, axial sensor 110 and/or perpendicular sensor 111, sensor system 100 can further comprise a control unit 520 coupled to an output of axial sensor 110 and perpendicular sensor 111 and configured to determine an estimation of a rotation angle. In embodiments, control unit 520 can comprise or be coupled to memory circuitry 522. Control unit 520 and/or memory circuitry 522 can be external but coupled to sensor 105, and/or memory circuitry 522 can be external to control unit 520, with the depiction in FIG. 5 being exemplary of but one embodiment. In embodiments, memory circuitry 522 can be utilized to store an offset value or other data computed by control unit 520. As previously described, sensors 110 and 111 can be configured to sense their respective magnetic field components associated with a rotational position of magnet 102. In embodiments, control unit 520 can be configured to process output signals Sa and Sb by, e.g., computing the sine and cosine functions of Sa and Sb, to determine a rotational angle, and calculating a difference in angles derived from $S_{a1}$, $S_{a2}$ and $S_{b1}$, $S_{b2}$.

In embodiments, the angle difference computed by control unit 520 can be used to identify outliers (i.e., defective sensors or sensor elements) and/or to determine a difference in angle estimations from sensor 110 and sensor 111 to improve the accuracy of sensor system 100 angle measurements. For example, during calibration system 100 compares the estimated angles of both sensor 110 and 111 to compute the angle difference. As such, the angle difference can be used to determine a degree of variation of the measured angles from the actual angles due to assembly tolerances, whereby a large (e.g., greater than 5 degrees, or some other suitable threshold in other embodiments) angle difference can indicate a large angle error. Additionally, during other operating conditions the angle difference can be used as an offset to correct angle errors associated with axial sensor 110 by summing the value with each output of sensor 110. During such operating conditions, axial sensor 110 can be used exclusively because it is robust against disturbances as discussed with reference to FIG. 4. In other words, the use and combination of two different sensors 110, 111 can take advantage of strengths or advantages of one that compensate for or remedy weaknesses or disadvantages of the other. Thus, individual values and/or all values associated with a defective or underperforming sensor element can be identified and/or removed from consideration in calculations and other determinations. Moreover, a more fundamental recognition of circumstances in which one or the other of the sensors 110 or 111 is stronger or weaker can be addressed by operating the sensor in a manner that takes advantage of the strength, minimizes the weakness and/or compensates one for the other by the two sensors 110, 111.

Figure 6:
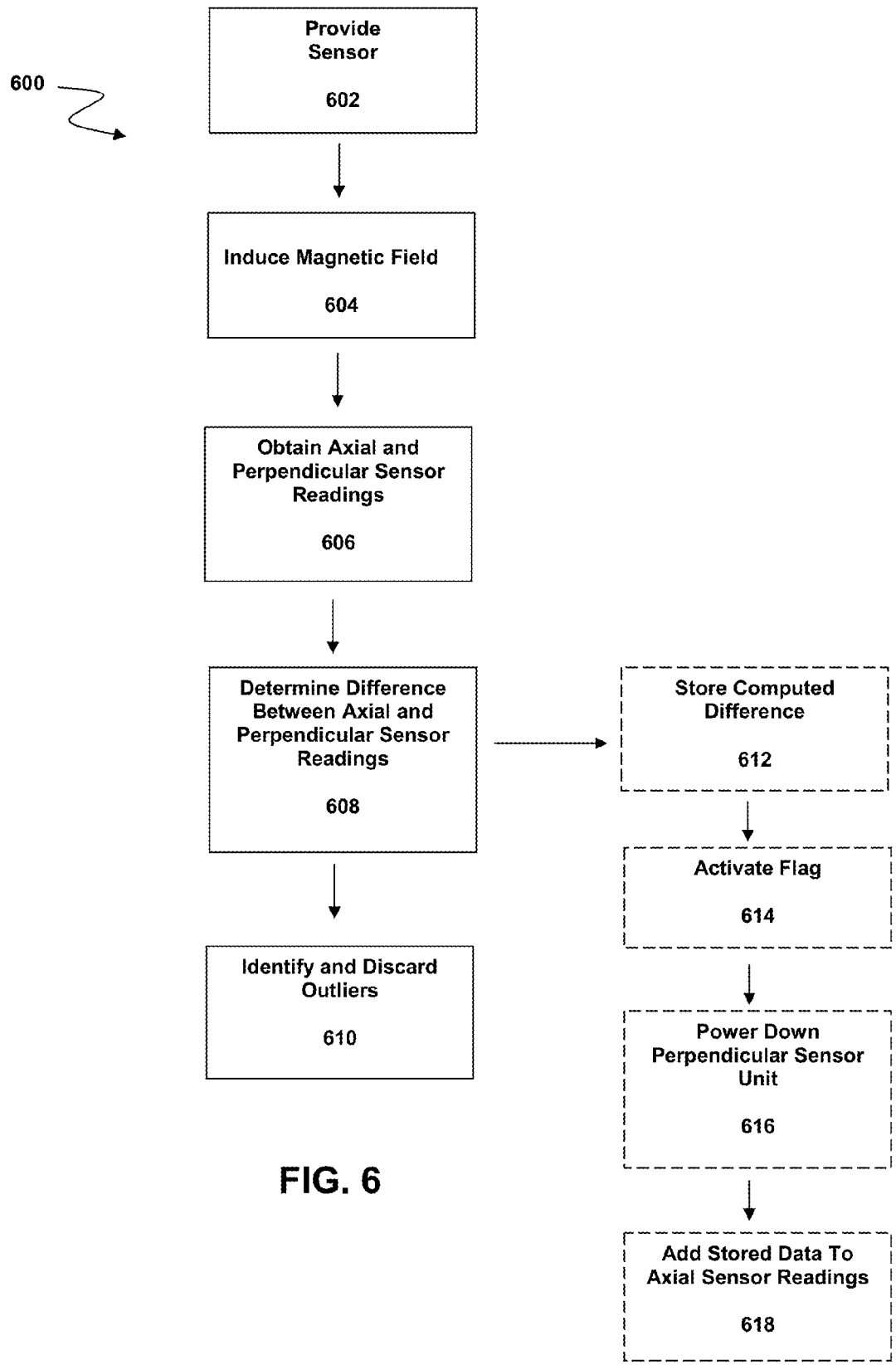
FIG. 6 depicts a flow chart diagram of a method according to an embodiment.

For example, and referring to FIG. 6, a flow chart according to an embodiment is depicted. In embodiments, a method 600 can be used to identify angle errors generated by axial sensor 110 and perpendicular sensor 111. At 602, sensor system 100 is provided, whereby each component can be manufactured utilizing CMOS technology or other manufacturing techniques. In addition, at 602, system 100 is installed and assembled (i.e., sensor package 105 is mounted proximate magnet 102 and magnet 102 is attached to shaft 104) to identify tolerances and whether system 100 can and/or should compensate for the tolerances. At 604, and in operation of sensor system 100, a magnetic field can be induced by rotation of magnet 102, whereby techniques such as temporarily utilizing magnetic shields and/or temporarily inhibiting the operation of motors can be used to reduce the effects of magnetic disturbance fields. For example, high permeability materials (i.e., materials with high magnetization) such as alloys or other suitable materials can be used to create an external barrier or shield around magnet 102 to attract and re-direct magnetic fields through the material to prevent magnetic fields from causing unintended interference. Similarly, temporarily reducing or removing power supplied to a motor can reduce the effects of electromagnetic interference caused by use of the motors. At 606, the corresponding readings are obtained by measuring output signals Sa and Sb. The angle difference between Sa and Sb is computed at 608 and can be used to identify and discard outliers (i.e., defective sensors) at 608. For example, the computed angle difference can be evaluated to determine the magnitude of angle errors resulting from assembly or other tolerances, or other sources. These angle differences can be computed for a single rotation angle, for some application relevant rotation angles, or for many rotation angles within the full range of angle occurring during operation. If the angle errors are outside of a predefined acceptable range, then at 610 defective sensor systems or parts of it can be discarded.

As discussed with reference to FIG. 2, system 100 can use perpendicular sensor 111 comprising, e.g., TMR sensors elements 208a-d to identify angle errors in some embodiments. Sensor elements 208a-d can be configured to form one or more evaluation circuits 202, 204 (i.e., bridge circuits), whereby sensor elements 208a-d provide large output signals (Sb) that can be measured without signal conditioning by external circuitry (e.g., a microprocessor or voltmeter). Thus, the use of TMR sensor elements can be advantageous because system costs are reduced without compromising angle accuracy.

In some embodiments, the computed difference from 608 can be used as an offset value that is stored in memory 522 at 612. In embodiments, operations 612-618 can be carried out after, concurrent with, instead of, or in only some periods of operation, with the depiction of method 600 in FIG. 6 merely illustrating various operations that can be carried out in different ways in different embodiments. In one embodiment, once the value is stored at 612, a flag can be set at 614, such as a predetermined bit of a register within control unit 520, to notify system 100 to switch off a supply signal to perpendicular sensor 111 at 616. As previously discussed, perpendicular sensor 111 can be switched off by removal of the supply source or by connecting the supply potential (Vsup) to the reference potential (Gnd) (refer, e.g., to FIG. 2). The rotational angle of magnet 102 can then be exclusively determined by axial sensor 110, which can be configured to provide a continuous and unambiguous angular range of 360 degrees in embodiments. At 618, control unit 520 can sum each output signal Sa of axial sensor 110 with the computed offset value to reduce angle errors and to improve the accuracy of the angle readings measured by axial sensor 110.

For example, as previously discussed, AMR sensor elements can be limited to a 180-degree angular range. The angular position can be represented by psi, where psi is the angle between a current flowline and the magnetization of a soft magnetic layer of the AMR sensor element. As such, utilizing the offset value calculated at 608 in combination with the output of axial sensor 110, the angular position of sensor system 100 can be determined in full 360-degree range (i.e., psi and psi+180). In embodiments, for example, control unit 520 can be configured to evaluate the output of sensors 110 and 111, whereby the output of axial sensor 110 can be used individually to determine angular readings greater than 180 degrees (i.e., psi+180). In such regions, the angular reading of axial sensor 110 can be used to estimate a corresponding angular reading of perpendicular sensor 111, whereby the measured differences between the angular readings are generally small (e.g., less than 5 degrees).

Figure 7A:
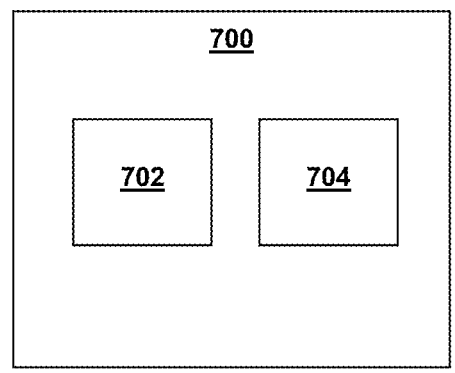
FIG. 7A depicts a top sectional view of a sensor system package according to an embodiment.
Figure 7B:
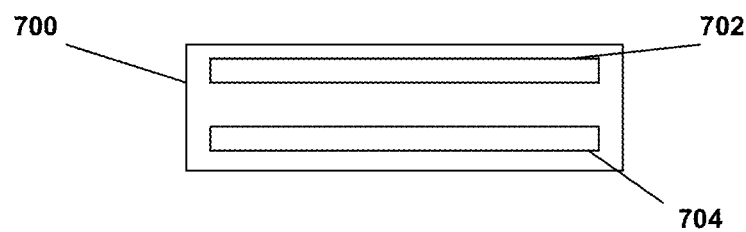
FIG. 7B depicts a side sectional view of a sensor system package according to an embodiment.

While embodiments discussed herein depict sensors 110 and 111 on a single substrate, in embodiments sensors 110 and 111 can be arranged on separate substrates in the same package or in different packages. For example, in FIG. 7A, sensor 110 is arranged on a first substrate 702 and sensor 111 is arranged on a second substrate 704 horizontally adjacent the first substrate, within sensor system package 700. In other embodiments, substrates 702 and 704 can be closer to and touching one another, or can be further spaced apart, differently sized, etc. Substrates 702 and 704 also can be arranged vertically adjacent one another, as depicted in FIG. 7B. In other embodiments, the relative positions of substrates 702 and 704 in either FIG. 7A or 7B can be reversed, and/or in FIG. 7B a die-on-die configuration can be implemented in which one substrate (or die) is mounted on the other. In yet another embodiment, a first substrate or die 702 can be arranged on a first side of a leadframe, and a second substrate or die 704 can be arranged on a second side of the leadframe. Still other configurations can be implemented in other embodiments, and both sensors 110 and 111 generally are arranged in the same package but need not be in every embodiments or configuration.

Embodiments thereby provide systems and methods can detect angle errors, such as those related to assembly errors and tolerances. At least one application of embodiments of the systems and methods discussed can be in end-of-line manufacturing testing and calibration, such as to determine whether any errors related to assembly tolerances might be present in any particular sensor or sensor system. For example, the sensor system can be assembled and mounted proximate a magnetic field source, such as a magnet configured to rotate on an axis of rotation. The magnetic field source can be rotated, and first and second (e.g., axial and perpendicular) sensor data can be obtained. A difference between the axial sensor data and the perpendicular sensor data can be determined. Data then can be output (such as the axial and/or perpendicular sensor data, and/or the difference determined), and the difference data optionally can be stored in the sensor for use during operation. In some embodiments, the sensor can be programmed to take the data into consideration during operation. Periodic implementation during operation after end-of-line testing and calibration can be useful to determine any drift over lifetime or other changes that can occur in operation, but need not be implemented in all cases.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A magnetic field sensor system comprising:
   a support structure;
   a first sensor arranged on the support structure relative to an axis of rotation of a magnetic field source and comprising a first plurality of sensor elements configured to sense magnetic field components along a first direction and to derive a first rotation angle unambiguously in a range of at least 90 degrees; and
   a second sensor arranged on the support structure relative to the axis of rotation and comprising a second plurality of sensor elements configured to sense magnetic field components along a second direction different from the first direction and to derive a second rotation angle unambiguously in a range of at least 70 degrees,
   wherein only one of the first direction or the second direction is perpendicular to the axis of rotation.

2. The magnetic field sensor system of claim 1, wherein the first sensor comprises an axial sensor and the first direction is generally axial to the axis of rotation, and wherein the second sensor comprises a perpendicular sensor and the second direction is generally perpendicular to the axis of rotation.

3. The magnetic field sensor system of claim 2, wherein the second sensor is arranged on a first portion of the support structure that defines an xy-plane that is perpendicular to the axis of rotation parallel with a z-axis, and wherein at least one of the magnetic field components along the second direction is at least one of an x-component of the magnetic field or a y-component of the magnetic field or a combination of x- and y-components of the magnetic field.

4. The magnetic field sensor system of claim 3, wherein at least one of the magnetic field components along the first direction is a z-component of the magnetic field.

5. The magnetic field sensor system of claim 4, wherein the first sensor is arranged on the first portion of the support structure.

6. The magnetic field sensor system of claim 4, wherein the first sensor is arranged on a second portion of the support structure, and wherein the first portion and second portion are arranged horizontally or vertically with respect to one another.

7. The magnetic field sensor system of claim 2, wherein the second plurality of sensor elements comprises at least one of magnetoresistive sensor elements, giant magneto-impedance sensor elements, or Hall-effect sensor elements.

8. The magnetic field sensor system of claim 2, wherein the first plurality of sensor elements comprises at least one of Hall-effect sensor elements or MAGFET sensor elements.

9. The magnetic field sensor system of claim 1, wherein the first plurality of sensor elements is arranged regularly spaced along a closed curve having a center of gravity on the axis of rotation.

10. The magnetic field sensor system of claim 9, wherein the closed curve is a circular curve.

11. The magnetic field sensor system of claim 9, wherein the second plurality of sensor elements is arranged within the closed curve.

12. The magnetic field sensor system of claim 11, wherein the second plurality of sensor elements comprises at least one half-bridge circuit.

13. The magnetic field sensor system of claim 1, wherein the first and second pluralities of sensor elements are concentrically arranged with respect to axis of rotation.

14. The magnetic field sensor system of claim 13, further comprising memory circuitry configured to store data related to at least one of the first rotation angle or the second rotation angle.

15. The magnetic field sensor system of claim 1, wherein the magnetic field sensor system is configured to selectively power off the second sensor.

* * * * *